US012749288B2

(12) United States Patent
Doan et al.

(10) Patent No.: US 12,749,288 B2
(45) Date of Patent: Sep. 29, 2026

(54) EXPLOITING HIERARCHICAL STRUCTURE LEARNING WITH HYPERBOLIC DISTANCE TO ENHANCE OPEN WORLD OBJECT DETECTION

(71) Applicant: Robert Bosch GmbH, Stuttgart (DE)

(72) Inventors: Thang Doan, San Francisco, CA (US); Xin Li, Sunnyvale, CA (US); Sima Behpour, Sunnyvale, CA (US); Wenbin He, Sunnyvale, CA (US); Liang Gou, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 421 days.

(21) Appl. No.: 18/375,808

(22) Filed: Oct. 2, 2023

(65) Prior Publication Data

US 2025/0111648 A1 Apr. 3, 2025

(51) Int. Cl.

*G06V 10/764* (2022.01)
*G06F 18/2137* (2023.01)

(Continued)

(52) U.S. Cl.

CPC ...... *G06V 10/764* (2022.01); *G06F 18/21375* (2023.01); *G06V 10/761* (2022.01);

(Continued)

(58) Field of Classification Search

CPC .. G06V 10/764; G06V 10/761; G06V 10/774; G06V 10/82; G06V 20/56;

(Continued)

(56) References Cited

U.S. PATENT DOCUMENTS

2023/0360365 A1* 11/2023 Minderer ............... G06V 10/82
2024/0193419 A1* 6/2024 Liang ..................... G06N 3/045

FOREIGN PATENT DOCUMENTS

CN 116843979 A * 10/2023 ........... G06V 10/764

OTHER PUBLICATIONS

Lang, Christopher, Alexander Braun, and Abhinav Valada. "On Hyperbolic Embeddings in 2D Object Detection." arXiv preprint arXiv:2203.08049. (Year: 2022).*

(Continued)

*Primary Examiner* — Ross Varndell
(74) *Attorney, Agent, or Firm* — Dickinson Wright PLLC

(57) ABSTRACT

A method of performing open world object detection includes receiving object data, that includes embeddings data corresponding to a plurality of embeddings for known objects in a first input image, projecting the embeddings into a hyperbolic embedding space that includes embeddings in a plurality of categories of objects each including one or more classes of objects, regularizing the projected embeddings within the hyperbolic embedding space by moving each of the projected embeddings closer to embeddings in a same category of the plurality of categories and further away from embeddings in different categories of the plurality of categories, receiving an unmatched query corresponding to an object in a second input image, and generating, based on the hyperbolic embedding space including the regularized embeddings, an output signal that indicates whether the object in the second input image corresponds to an unknown object in one of the classes of objects.

11 Claims, 19 Drawing Sheets

(51) Int. Cl.

| | |
|---|---|
| ***G06N 3/044*** | (2023.01) |
| ***G06V 10/74*** | (2022.01) |
| ***G06V 10/774*** | (2022.01) |
| ***G06V 10/82*** | (2022.01) |
| ***G06V 20/56*** | (2022.01) |

(52) U.S. Cl.
CPC ............ *G06V 10/774* (2022.01); *G06V 10/82* (2022.01); *G06N 3/044* (2023.01); *G06V 20/56* (2022.01); *G06V 2201/07* (2022.01)

(58) Field of Classification Search
CPC .............. G06V 2201/07; G06V 10/255; G06F 18/21375; G06F 18/2414; G06N 3/044
See application file for complete search history.

(56) References Cited

OTHER PUBLICATIONS

Ge, Songwei, et al. "Hyperbolic Contrastive Learning for Visual Representations beyond Objects." arXiv preprint arXiv:2212.00653. (Year: 2022).*

Doan, Thang, et al. "Hyp-OW: Exploiting Hierarchical Structure Learning with Hyperbolic Distance Enhances Open World Object Detection." arXiv preprint arXiv:2306.14291. (Year: 2023).*

Abhishek Balasubramaniam and Sudeep Pasricha. Object detection in autonomous vehicles: Status and open challenges, 2022.

Abhijit Bendale and Terrance Boult. Towards open world recognition. 2015 IEEE Conference on Computer Vision and Pattern Recognition (CVPR), Jun. 2015. doi: 10.1109/cvpr.2015.7298799. URL http://dx.doi.org/10.1109/CVPR.2015.7298799.

Mathilde Caron, Hugo Touvron, Ishan Misra, Herve Jegou, Julien Mairal, Piotr Bojanowski, and Armand Joulin. Emerging properties in self-supervised vision transformers. In Proceedings of the IEEE/CVF international conference on computer vision, pp. 9650-9660, 2021.

Thang Doan, Mehdi Abbana Bennani, Bogdan Mazoure, Guillaume Rabusseau, and Pierre Alquier. A theoretical analysis of catastrophic forgetting through the ntk overlap matrix. In Arindam Banerjee and Kenji Fukumizu, editors, Proceedings of The 24th International Conference on Artificial Intelligence and Statistics, vol. 130 of Proceedings of Machine Learning Research, pp. 1072-1080. PMLR, Apr. 13-15, 2021. URL https://proceedings.mlr.press/v130/doan21a.html.

Aleksandr Ermolov, Leyla Mirvakhabova, Valentin Khrulkov, Nicu Sebe, and Ivan Oseledets. Hyperbolic vision transformers: Combining improvements in metric learning. In Proceedings of the IEEE/CVF Conference on Computer Vision and Pattern Recognition, pp. 7409-7419, 2022.

Mark Everingham, Luc Van Gool, Christopher KI Williams, John Winn, and Andrew Zisserman. The pascal visual object classes (voc) challenge. International journal of computer vision, 88:303-338, 2010.

Songwei Ge, Shlok Mishra, Simon Kornblith, Chun-Liang Li, and David Jacobs. Hyperbolic contrastive learning for visual representations beyond objects. arXiv preprint arXiv:2212.00653, 2022.

Akshita Gupta, Sanath Narayan, KJ Joseph, Salman Khan, Fahad Shahbaz Khan, and Mubarak Shah. Ow-detr: Open-world detection transformer. In CVPR, 2022.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Yusuke Hosoya, Masanori Suganuma, and Takayuki Okatani. More practical scenario of open-set object detection: Open at category level and closed at super-category level. ArXiv, abs/2207.09775, 2022.

Palash Yuvraj Ingle and Young-Gab Kim. Real-time abnormal object detection for video surveillance in smart cities. Sensors, 22(10), 2022. ISSN 1424-8220. doi: 10.3390/s22103862. URL https://www.mdpi.com/1424-8220/22/10/3862.

Ayush Jaiswal, Yue Wu, Pradeep Natarajan, and Premkumar Natarajan. Class-agnostic object detection. In Proceedings of the IEEE/CVF Winter Conference on Applications of Computer Vision, pp. 919-928, 2021.

K J Joseph, Salman Khan, Fahad Shahbaz Khan, and Vineeth N Balasubramanian. Towards open world object detection. In Proceedings of the IEEE/CVF Conference on Computer Vision and Pattern Recognition (CVPR 2021), 2021.

Valentin Khrulkov, Leyla Mirvakhabova, Evgeniya Ustinova, Ivan Oseledets, and Victor Lempitsky. Hyperbolic image embeddings. In The IEEE/CVF Conference on Computer Vision and Pattern Recognition (CVPR), Jun. 2020.

Dahun Kim, Tsung-Yi Lin, Anelia Angelova, In So Kweon, andWeicheng Kuo. Learning open-world object proposals without learning to classify. IEEE Robotics and Automation Letters (RA-L), 2022.

James Kirkpatrick, Razvan Pascanu, Neil Rabinowitz, Joel Veness, Guillaume Desjardins, Andrei A. Rusu, Kieran Milan, John Quan, Tiago Ramalho, Agnieszka Grabska-Barwinska, Demis Hassabis, Claudia Clopath, Dharshan Kumaran, and Raia Hadsell. Overcoming catastrophic forgetting in neural networks. Proceedings of the National Academy of Sciences, 114(13):3521-3526, 2017. doi: 10.1073/pnas.1611835114. URL https://www.pnas.org/doi/abs/10.1073/pnas. 1611835114.

Harold W. Kuhn. The Hungarian Method for the Assignment Problem. Naval Research Logistics Quarterly, 2 (1-2):83-97, Mar. 1955. doi: 10.1002/nav.3800020109.

Christopher Lang, Alexander Braun, Lars Schillingmann, and Abhinav Valada. On hyperbolic embeddings in object detection. In Pattern Recognition: 44th DAGM German Conference, DAGM GCPR 2022, Konstanz, Germany, Sep. 27-30, 2022, Proceedings, pp. 462-476. Springer, 2022.

Marc Law, Renjie Liao, Jake Snell, and Richard Zemel. Lorentzian distance learning for hyperbolic representations. In Kamalika Chaudhuri and Ruslan Salakhutdinov, editors, Proceedings of the 36th International Conference on Machine Learning, vol. 97 of Proceedings of Machine Learning Research, pp. 3672-3681. PMLR, Jun. 9-15, 2019. URL https://proceedings.mlr. press/v97/law19a.html.

Kimin Lee, Kibok Lee, Honglak Lee, and Jinwoo Shin. A simple unified framework for detecting out-of-distribution samples and adversarial attacks. Advances in neural information processing systems, 31, 2018.

Tsung-Yi Lin, Michael Maire, Serge Belongie, James Hays, Pietro Perona, Deva Ramanan, Piotr Dollar, and C. Lawrence Zitnick. Microsoft coco: Common objects in context. Lecture Notes in Computer Science, p. 740-755, 2014. ISSN 1611-3349. doi: 10.1007/978-3-319-10602-1_48. URL http://dx.doi.org/10.1007/978-3-319-10602-1_48.

Shaoteng Liu, Jingjing Chen, Liangming Pan, Chong-Wah Ngo, Tat-Seng Chua, and Yu-Gang Jiang. Hyperbolic visual embedding learning for zero-shot recognition. In Proceedings of the IEEE/CVF conference on computer vision and pattern recognition, pp. 9273-9281, 2020.

Muhammad Maaz, Hanoona Rasheed, Salman Khan, Fahad Shahbaz Khan, Rao Muhammad Anwer, and Ming-Hsuan Yang. Class-agnostic object detection with multi-modal transformer. In Computer Vision-ECCV 2022: 17th European Conference, Tel Aviv, Israel, Oct. 23-27, 2022, Proceedings, Part X, pp. 512-531. Springer, 2022.

Ukas Malburg, Manfred-Peter Rieder, Ronny Seiger, Patrick Klein, and Ralph Bergmann. Object detection for smart factory processes by machine learning. Procedia Computer Science, 184: 581-588, 2021. ISSN 1877-0509. doi: https://doi.org/10.1016/j.procs.2021.04.009. URL https: //www.sciencedirect.com/science/article/piiS1877050921007821. The 12th International Conference on Ambient Systems, Networks and Technologies (ANT) / The 4th International Conference on Emerging Data and Industry 4.0 (EDI40) / Affiliated Workshops.

Angelo G Menezes, Gustavo de Moura, Cezanne Alves, and Andre CPLF de Carvalho. Continual object detection: a review of definitions, strategies, and challenges. Neural Networks, 2023.

(56) References Cited

OTHER PUBLICATIONS

Maximillian Nickel and Douwe Kiela. Learning continuous hierarchies in the lorentz model of hyperbolic geometry. In International conference on machine learning, pp. 3779-3788. PMLR, 2018.
Jiwoong Park, Junho Cho, Hyung Jin Chang, and Jin Young Choi. Unsupervised hyperbolic representation learning via message passing auto-encoders. In Proceedings of the IEEE/CVF Conference on Computer Vision and Pattern Recognition, pp. 5516-5526, 2021.
Jeffrey Pennington, Richard Socher, and Christopher Manning. GloVe: Global vectors for word representation. In Proceedings of the 2014 Conference on Empirical Methods in Natural Language Processing (EMNLP), pp. 1532-1543, Doha, Qatar, Oct. 2014. Association for Computational Linguistics. doi: 10.3115/v1/D14-1162. URL https://aclanthology.org/D14-1162.
Kuniaki Saito, Ping Hu, Trevor Darrell, and Kate Saenko. Learning to detect every thing in an open world. In Computer Vision-ECCV 2022: 17th European Conference, Tel Aviv, Israel, Oct. 23-27, 2022, Proceedings, Part XXIV, pp. 268-284. Springer, 2022.
Zhiheng Wu, Yue Lu, Xingyu Chen, Zhengxing Wu, Liwen Kang, and Junzhi Yu. Uc-owod: Unknown-classified open world object detection. In Computer Vision-ECCV 2022: 17th European Conference, Tel Aviv, Israel, Oct. 23-27, 2022, Proceedings, Part X, pp. 193-210. Springer, 2022b.
Jiexi Yan, Lei Luo, Cheng Deng, and Heng Huang. Unsupervised hyperbolic metric learning. In Proceedings of the EEE/CVF Conference on Computer Vision and Pattern Recognition, pp. 12465-12474, 2021.
Ruixin Yang and Yingyan Yu. Artificial convolutional neural network in object detection and semantic segmentation for medical imaging analysis. Frontiers in Oncology, 11, 2021. ISSN 2234-943X. doi: 10.3389/fonc.2021.638182. URL https://www.frontiersin.org/articles/10. 3389/fonc.2021.638182.
Jinan Yu, Liyan Ma, Zhenglin Li, Yan Peng, and Shaorong Xie. Open-world object detection via discriminative class prototype learning. In 2022 IEEE International Conference on Image Processing (ICIP), pp. 626-630, 2022. doi: 10.1109/ICIP46576.2022.9897461.
Yun Yue, Fangzhou Lin, Kazunori D Yamada, and Ziming Zhang. Hyperbolic contrastive learning. arXiv preprint arXiv:2302.01409, 2023.
Zhengxue Zhou, Leihui Li, Alexander Fursterling, Hjalte Joshua Durocher, Jesper Mouridsen, and Xuping Zhang. Learning-based object detection and localization for a mobile robot manipulator in sme production. Robotics and Computer-Integrated Manufacturing, 73:102229, 2022. ISSN 0736-5845. doi: https://doi.org/10.1016/j.rcim.2021.102229. URL https: //www.sciencedirect.com/science/article/pii/S0736584521001113.
Xizhou Zhu, Weijie Su, Lewei Lu, Bin Li, Xiaogang Wang, and Jifeng Dai. Deformable {detr}: Deformable transformers for end-to-end object detection. In International Conference on Learning Representations, 2021. URL https://openreview.net/forumid=gZ9hCDWe6ke.
Orr Zohar, Kuan-Chieh Wang, and Serena Yeung. Prob: Probabilistic objectness for open world object detection, 2022.

* cited by examiner

424

| | | Task 1 | | Task 2 | | Task 3 | | Task 4 |
|---|---|---|---|---|---|---|---|---|
| | | U-Recall(↑) | mAP (↑) | U-Recall(↑) | mAP (↑) | U-Recall(↑) | mAP (↑) | mAP (↑) |
| Low | ORE - EBUI | 1.5 | 61.4 | 3.9 | 40.6 | 3.6 | 33.7 | 31.8 |
| | OW-DETR | 5.7 | 71.5 | 6.2 | 43.8 | 6.9 | 38.5 | 33.1 |
| | PROB | 17.6 | 73.4 (+0.7) | 22.3 | 50.4 | 24.8 | 42.0 | 39.9 |
| | Hyp-OW | 23.9 (+6.3) | 72.7 | 23.3 (+1.0) | 50.6 | 25.4 | 46.2 (+4.2) | 44.8 (+4.9) |
| Medium | ORE - EBUI | 4.9 | 56.0 | 2.9 | 39.4 | 3.9 | 29.7 | 25.3 |
| | UC-OWOD | 2.4 | 50.7 | 3.4 | 8.7 | 16.3 | 24.6 | 23.2 |
| | OCPL | 8.26 | 56.6 | 7.65 | 39.1 | 11.9 | 30.7 | 26.7 |
| | 2B-OCD | 12.1 | 56.4 | 9.4 | 38.5 | 11.6 | 29.2 | 25.8 |
| | OW-DETR | 7.5 | 56.2 | 6.2 | 42.9 | 5.7 | 30.8 | 27.8 |
| | PROB | 19.4 | 56.5 | 17.4 | 44.0 | 19.6 | 36.0 | 31.5 |
| | Hyp-OW | 23.5 (+4.1) | 59.4 | 20.6 (+3.2) | 44.4 | 26.3 (+6.7) | 36.8 | 33.6 (+2.1) |
| High | OW-DETR | 7.0 | 47.3 | 11.0 | 38.6 | 8.8 | 38.3 | 38.2 |
| | PROB | 29.4 | 49.6 | 43.9 | 42.9 | 52.7 | 41.3 | 41.0 |
| | Hyp-OW | 34.9 (+5.5) | 49.6 | 47.5 (+3.6) | 45.5 (+2.6) | 55.2 (+2.5) | 44.3 (+3.1) | 43.9 (+2.9) |

FIG. 4B

432

| | Task 1 | | Task 2 | | Task 3 | | Task 4 |
|---|---|---|---|---|---|---|---|
| | U-Recall(↑) | mAP (↑) | U-Recall(↑) | mAP (↑) | U-Recall(↑) | mAP (↑) | mAP (↑) |
| Hyp-OW | 34.9 | 49.9 | 47.5 | 45.5 | 55.2 | 44.3 | 43.9 |
| With Cosine Distance | 32.8 (-2.1) | 49.0 (-0.9) | 46.4 (-1.1) | 45.4 | 55.4 | 43.2 (-1.1) | 43.1 |
| Without SuperClass Regularizer | 32.0 (-2.9) | 50.0 | 47.1 | 45.1 | 52.9 (-2.3) | 43.7 | 43.5 |
| Without Adaptive Relabeling | 34.7 | 41.2 (-8.7) | 47.6 | 38.9 (-6.6) | 54.1 (-1.1) | 36.5 (-7.8) | 36.1 (-7.8) |

FIG. 4D

EXPLOITING HIERARCHICAL STRUCTURE LEARNING WITH HYPERBOLIC DISTANCE TO ENHANCE OPEN WORLD OBJECT DETECTION

TECHNICAL FIELD

The present disclosure relates to open world object detection (OWOD), and more particularly to systems and methods of operating devices that implement OWOD.

BACKGROUND

Advances in Object Detection (OD) have unlocked a plethora of practical applications such as robotics or self-driving cars. Breakthroughs in attention-based neural network architecture, such as Deformable Transformers, have yielded impressive performance in these settings. However, most of these approaches assume a fixed number of classes (closed-world assumption), which is rare in reality. Continual Object Detection incrementally adds new classes, resulting in a distribution shift in the input and the well-known phenomenon of "catastrophic forgetting," which refers to the network forgetting previously learned knowledge.

Open World Object Detection (OWOD) is a challenging and realistic task that extends beyond the scope of standard Object Detection tasks. Open World systems introduce the detection and integration of new classes. Accordingly, OWOD involves detecting both known and unknown objects while integrating learned knowledge for future tasks.

SUMMARY

A method of performing open world object detection includes receiving object data, that includes embeddings data corresponding to a plurality of embeddings for known objects in a first input image, projecting the embeddings into a hyperbolic embedding space that includes embeddings in a plurality of categories of objects each including one or more classes of objects, regularizing the projected embeddings within the hyperbolic embedding space by moving each of the projected embeddings closer to embeddings in a same category of the plurality of categories and further away from embeddings in different categories of the plurality of categories, receiving an unmatched query corresponding to an object in a second input image, and generating, based on the hyperbolic embedding space including the regularized embeddings, an output signal that indicates whether the object in the second input image corresponds to an unknown object in one of the classes of objects.

In other features, the object data includes a set of bounding boxes and class labels for the known objects in the first input image. The first input image corresponds to a training image. The method further includes determining a hyperbolic contrastive loss corresponding to the hyperbolic embedding space and regularizing the projected embeddings includes regularizing the projected embeddings based on the hyperbolic contrastive loss. Regularizing the projected embeddings includes determining respective hyperbolic averages of embeddings in each of the classes of objects. Generating the output signal includes determining a threshold distance based on the hyperbolic averages and generating the output signal based in part on the threshold distance. Generating the output signal includes determining whether the unmatched query is less than the threshold distance from at least one of the hyperbolic averages.

A computing device configured to perform open world object detection includes a processing device configured to execute instructions stored in memory to receive object data, wherein the object data includes embeddings data corresponding to a plurality of embeddings for known objects in a first input image, project the embeddings into a hyperbolic embedding space that includes embeddings in a plurality of categories of objects each including one or more classes of objects, regularize the projected embeddings within the hyperbolic embedding space by moving each of the projected embeddings closer to embeddings in a same category of the plurality of categories and further away from embeddings in different categories of the plurality of categories, receive an unmatched query corresponding to an object in a second input image, and generate, based on the hyperbolic embedding space including the regularized embeddings, an output signal that indicates whether the object in the second input image corresponds to an unknown object in one of the classes of objects.

In other features, the object data includes a set of bounding boxes and class labels for the known objects in the first input image. The first input image corresponds to a training image. The processing device further configured to execute instructions stored in memory to generate a hyperbolic contrastive loss corresponding to the hyperbolic embedding space, wherein regularizing the projected embeddings includes regularizing the projected embeddings based on the hyperbolic contrastive loss. To regularize the projected embeddings, the processing device is further configured to execute instructions stored in memory to determine respective hyperbolic averages of embeddings in each of the classes of objects. The generate the output signal, the processing device is further configured to execute instructions stored in memory to determine a threshold distance based on the hyperbolic averages and generate the output signal based in part on the threshold distance. To generate the output signal, the processing device is further configured to execute instructions stored in memory to determine whether the unmatched query is less than the threshold distance from at least one of the hyperbolic averages.

A computer-controlled machine includes at least one sensor configured to generate a first input image and a second input image, a control system configured to receive object data that includes embeddings data corresponding to a plurality of embeddings for known objects in a first input image, project the embeddings into a hyperbolic embedding space that includes embeddings in a plurality of categories of objects each including one or more classes of objects, regularize the projected embeddings within the hyperbolic embedding space by moving each of the projected embeddings closer to embeddings in a same category of the plurality of categories and further away from embeddings in different categories of the plurality of categories, receive an unmatched query corresponding to an object in a second input image, and generate, based on the hyperbolic embedding space including the regularized embeddings, an output signal that indicates whether the object in the second input image corresponds to an unknown object in one of the classes of objects, and an actuator configured to control an operation of the computer-controlled machine in response to the output signal.

In other features, the computer-controlled machine further includes memory that stores data corresponding to the hyperbolic embedding space. The control system is further configured to generate a hyperbolic contrastive loss corresponding to the hyperbolic embedding space and wherein regularizing the projected embeddings includes regularizing the projected embeddings based on the hyperbolic contrastive loss. To regularize the embeddings, the control system is further configured to determine respective hyperbolic averages of embeddings in each of the classes of objects. To generate the output signal, the control system is further configured to determine a threshold distance based on the hyperbolic averages and determine whether the unmatched query is less than the threshold distance from at least one of the hyperbolic averages. The computer-controlled machine includes an autonomous robot.

BRIEF DESCRIPTION OF THE DRAWINGS

FIG. 4B is a table illustrating example performance of a data set according to principles of the present disclosure relative to other example data sets for various tasks.

FIG. 4D is a table illustrating an example ablation analysis that quantifies the impact of individual components of techniques of the present disclosure.

DETAILED DESCRIPTION

Figure 1:
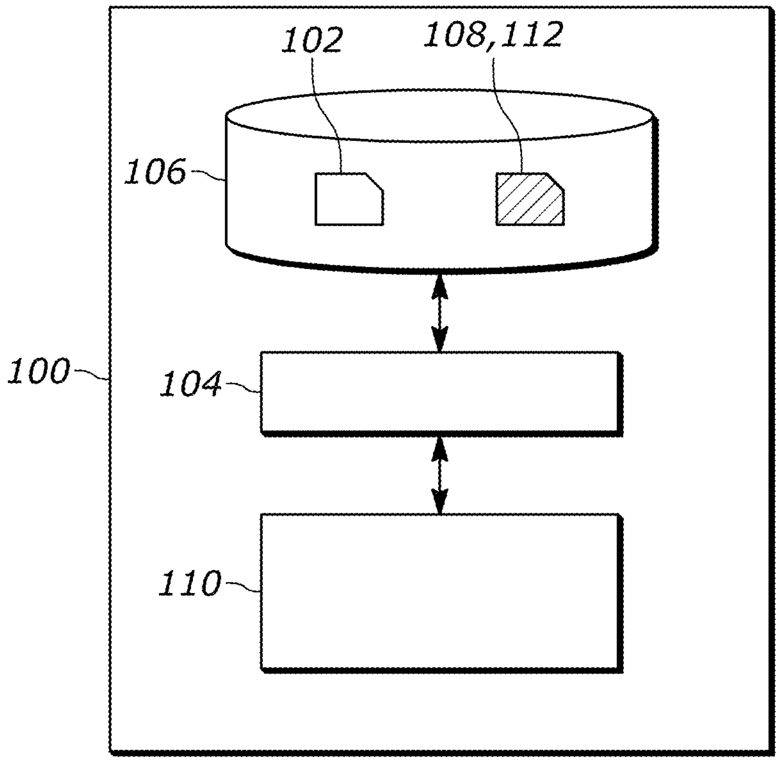
FIG. 1 generally illustrates a system for training a neural network according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Open World Object Detection (OWOD) involves detecting both known (previously seen and classified during training) and unknown (not previously seen and classified and/or outside of known classes) objects. However, the level of "unknown-ness" varies significantly depending the context. For example, a tree is typically considered part of the background in a self-driving scene but may also be significant in a household context.

The OWOD framework includes both detection tasks and continual learning. However, a significant challenge within this framework lies in the absence of annotations for unknown objects, leading to biases towards known labels and potential confusion between unknown items and the background. This bias significantly impedes the accurate identification of unknown objects and presents a major hurdle in the detection process.

Previous attempts to solve this problem involve various techniques, such as reliance upon a learned objectness score to relabel the background as potential unknowns, clustering classes to better isolate unknowns, and a decoupled approach where the classification and localization heads are separated. The objective is to remove label information and instead capture the shared features that makes labelled items relevant as objects.

However, these techniques fail to address a crucial problem, which is defining what constitutes an "unknown" object. Currently, there is no clear definition or prior knowledge available to effectively distinguish unknown objects from the background and interpretation greatly varies depending on the context. For example, in a driving scene, "debris on the road" could be considered an unknown object that is relevant to a task. Conversely, in a camera surveillance context, the "debris on the road" might be perceived as part of the background. Without consideration of the context, previous techniques can only learn to differentiate knowns and unknowns with respect to low level features such as texture or shape. As a consequence, modeling hierarchical structures and similarities between known and unknown items, whether at the image level or dataset level, is not performed.

Accordingly, systems and methods according to the principles of the present disclosure define a hierarchical structural relationship between the objects to be discovered and the known items or objects. This hierarchy is characterized by classes that share the same semantic context and belonging to the same category (e.g., vehicles, animals, electronics, etc.). Such hierarchical relationships enable the retrieval of common features and facilitate the discovery of unknown objects. For example, a model trained on objects related to driving scenes can adequately detect stop signs or traffic lights but is not expected to recognize unrelated objects like a couch or other furniture.

As such, as implemented in systems and methods of the present disclosure, external or contextual information is already embedded within the known classes. In other words, there is a semantic or latent structure relationship between the known and unknown items to be discovered. The systems and methods described herein learn and model a hierarchical representation of known items using a regularizer configured in accordance with the principles of the present disclosure (e.g., a SuperClass Regularizer). Leveraging the learned hierarchical representation enables detection unknown objects using adaptive relabeling (a Similarity Distance-based Relabeling module, circuitry, etc.).

In this manner, hierarchical relationships between items are learned in order to effectively utilize the representation of known objects for the discovery of unknown items. For example, items belonging to the same family (or category) may be closer to each other while being further away from different families (e.g., closer to other animals while being further away from vehicles). To capture this structural hierarchy, systems and methods described herein calculate and operate in accordance with a hyperbolic distance (which maps hierarchical latent structures, such as graphs or trees, and functions as a natural distance metric). This mapping in the hyperbolic space exhibits the desirable property of capturing the affinity between unknown items and known items, thereby enhancing the detection of unknown objects.

FIG. 1 shows one example system 100 for training a neural network (e.g., of an ML model). The system 100 may be configured to (and/or include circuitry configured to) implement the systems and methods of the present disclosure described below in more detail. The system 100 may comprise an input interface for accessing training data 102 for the neural network. For example, as illustrated in FIG. 1, the input interface may be constituted by a data storage interface 104 which may access the training data 102 from data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also external data storage, e.g., network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network. This data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
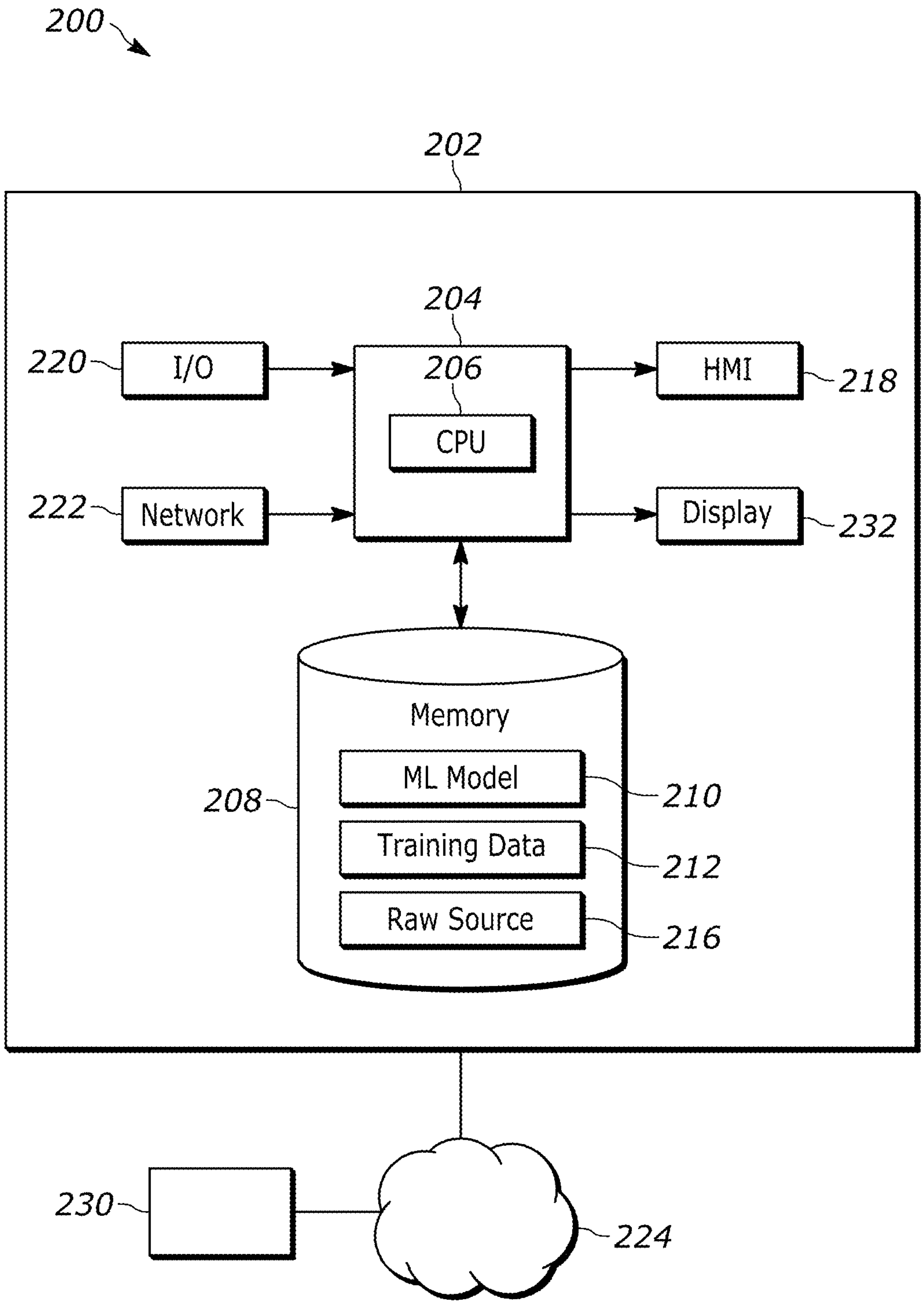
FIG. 2 generally illustrates a computer-implemented method for training and utilizing a neural network according the principles of the present disclosure.

FIG. 2 depicts a data annotation/augmentation system 200 configured to (and/or including circuitry configured to) implement a system for annotating and/or augmenting data. The data annotation system 200 may include at least one computing system 202 configured to implement all or portions of the systems and methods of the present disclosure explained below in more detail. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. Various components of the system 200 may be implemented with same or different circuitry.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 that is configured to analyze the raw source dataset 216. For example, the CPU 206 and/or other circuitry may implement the machine-learning model 210. The raw source dataset 216 may include raw or unprocessed sensor data that may be representative of an input dataset for a machine-learning system. The raw source dataset 216 may include video, video segments, images, audio, text-based information, and raw or partially processed sensor data (e.g., radar map of objects). In some embodiments, the machine-learning model 210 may be a deep-learning or neural network algorithm that is designed to perform a predetermined function. For example, the neural network algorithm may be configured to identify events or objects in video segments based on audio data.

The computer system 200 may store the training dataset 212 for the machine-learning model 210. The training dataset 212 may represent a set of previously constructed data for training the machine-learning model 210. For example, the training dataset 212 according to the present disclosure may include multiple automatically-collected ground-truth measurements and associated data. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to generate annotated data.

The machine-learning model 210 may be configured to identify a particular feature in the raw source data 216. The raw source data 216 may include a plurality of instances or input dataset for which annotation results are desired (e.g., a video stream or segment including audio data). For example only, the machine-learning model 210 may be configured to identify objects or events in a video segment based on audio data and annotate the events. The machine-learning model 210 may be programmed to process the raw source data 216 to identify the presence of the particular features. The machine-learning model 210 may be configured to identify a feature in the raw source data 216 as a predetermined feature. The raw source data 216 may be derived from a variety of sources. For example, the raw source data 216 may be actual input data collected by a machine-learning system. The raw source data 216 may be machine generated for testing the system. As an example, the raw source data 216 may include raw video and/or audio data from a camera, audio data from a microphone, etc.

In an example, the machine-learning model 210 may process raw source data 216 and output video and/or audio data including one or more indications of an identified event. The machine-learning model 210 may generate a confidence level or factor for each output generated. For example, a confidence value that exceeds a predetermined high-confidence threshold may indicate that the machine-learning model 210 is confident that the identified event (or feature) corresponds to the particular event. A confidence value that is less than a low-confidence threshold may indicate that the machine-learning model 210 has some uncertainty that the particular feature is present.

Figure 3A:
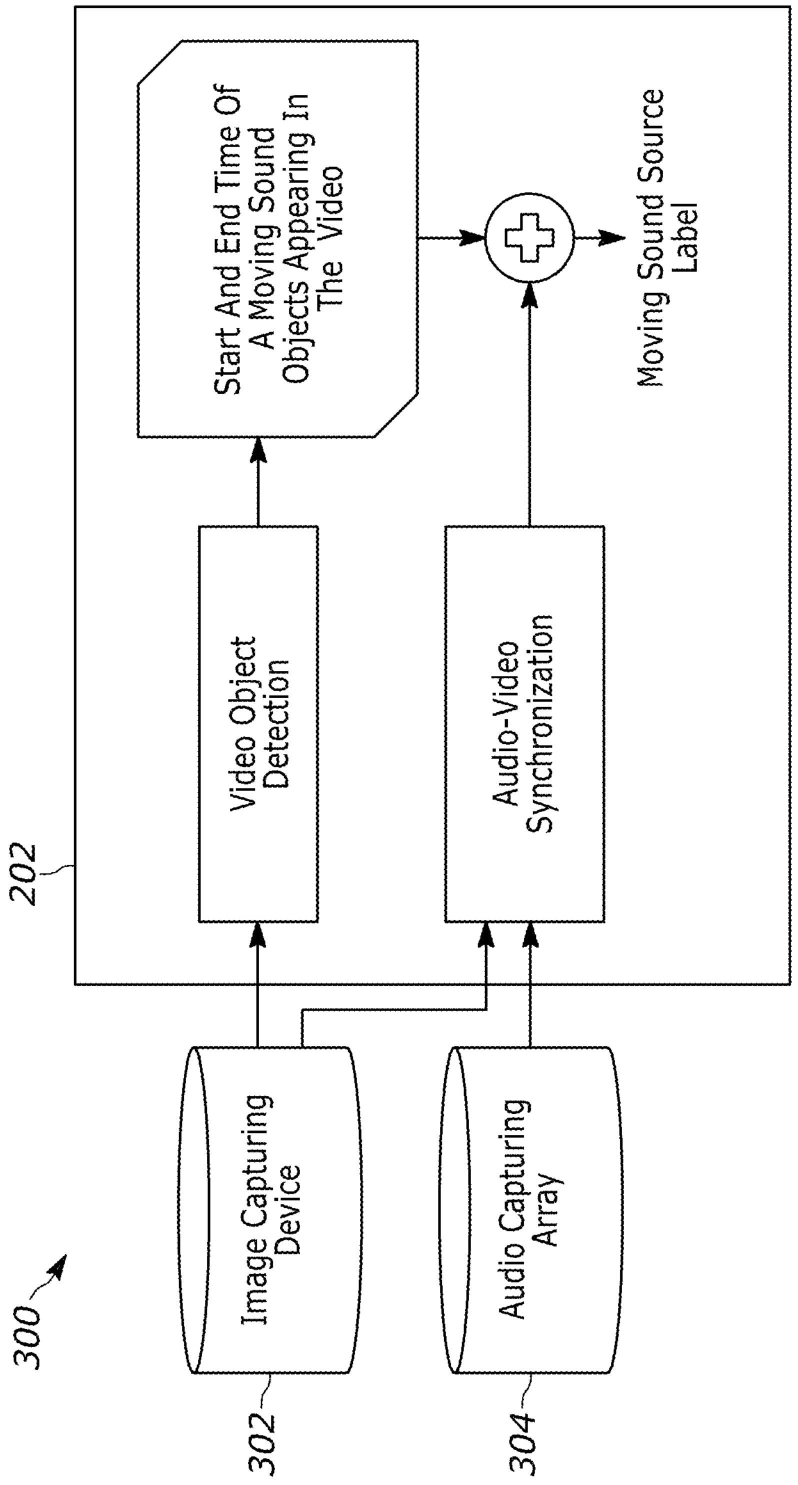
FIG. 3A generally illustrates an audio data labeling system according to the principles of the present disclosure.
Figure 3B:
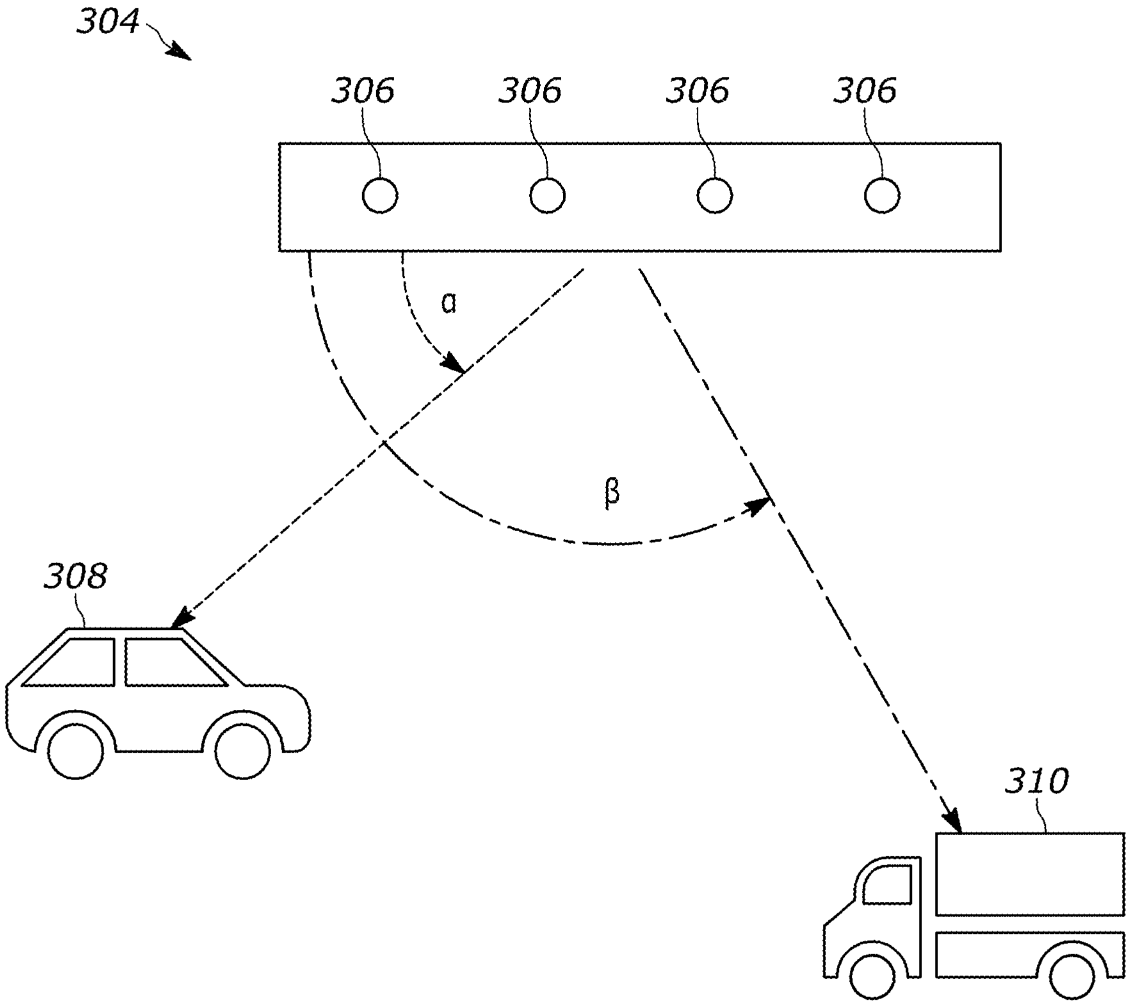
FIG. 3B generally illustrates a portion of a data capturing system according to the principles of the present disclosure.

As is generally illustrated in FIGS. 3A and 3B, a system 300 may include an image (e.g., video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine-learning model (e.g., such as the machine-learning model 210 or other suitable machine-learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Figure 3C:
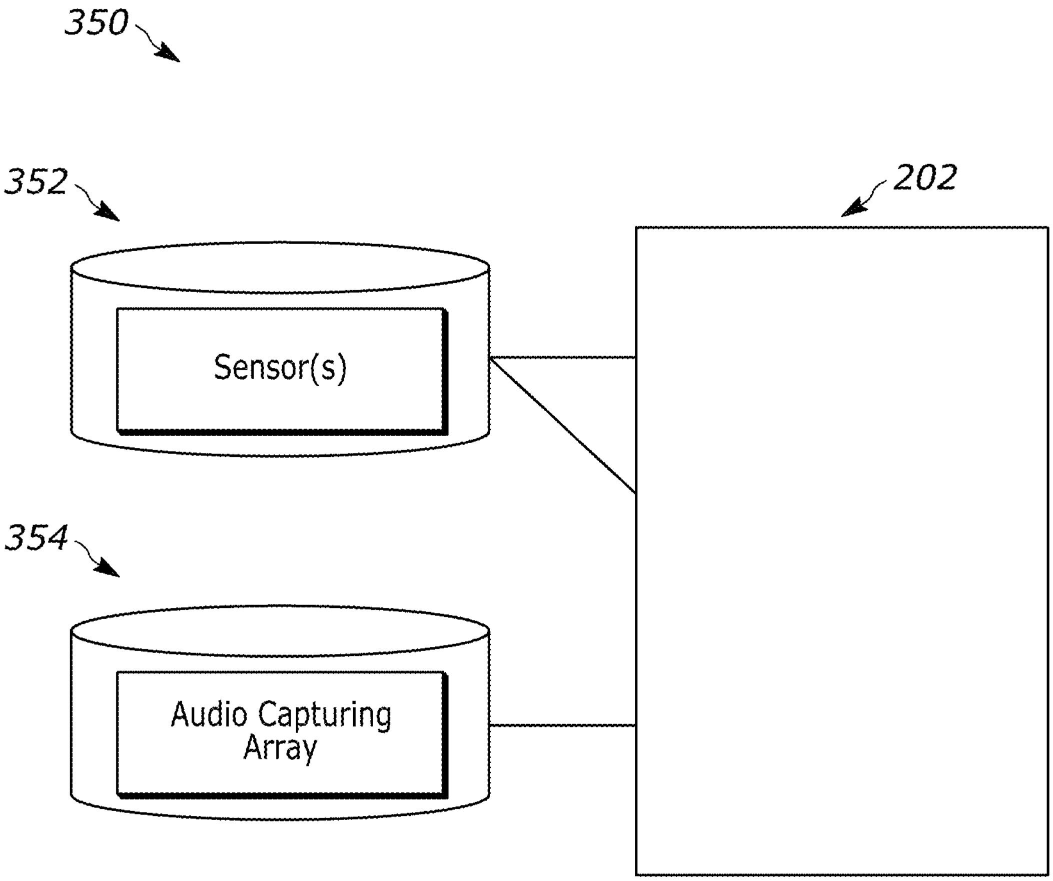
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine-learning model using the training data. The system 202 may detect, using the second machine-learning model, one or more sounds associated with audio data provided as input to the second machine-learning model. The second machine-learning model may include any suitable machine-learning model and may be configured to perform any suitable function, such as those described herein with respect to FIGS. 4-11.

Any of the systems described above and/or below in more detail may implement systems and methods of the present disclosure to perform OWOD. Systems and methods of the present disclosure may be referred to as hyperbolic open world ("Hyp-OW") systems and methods.

Figure 4A:
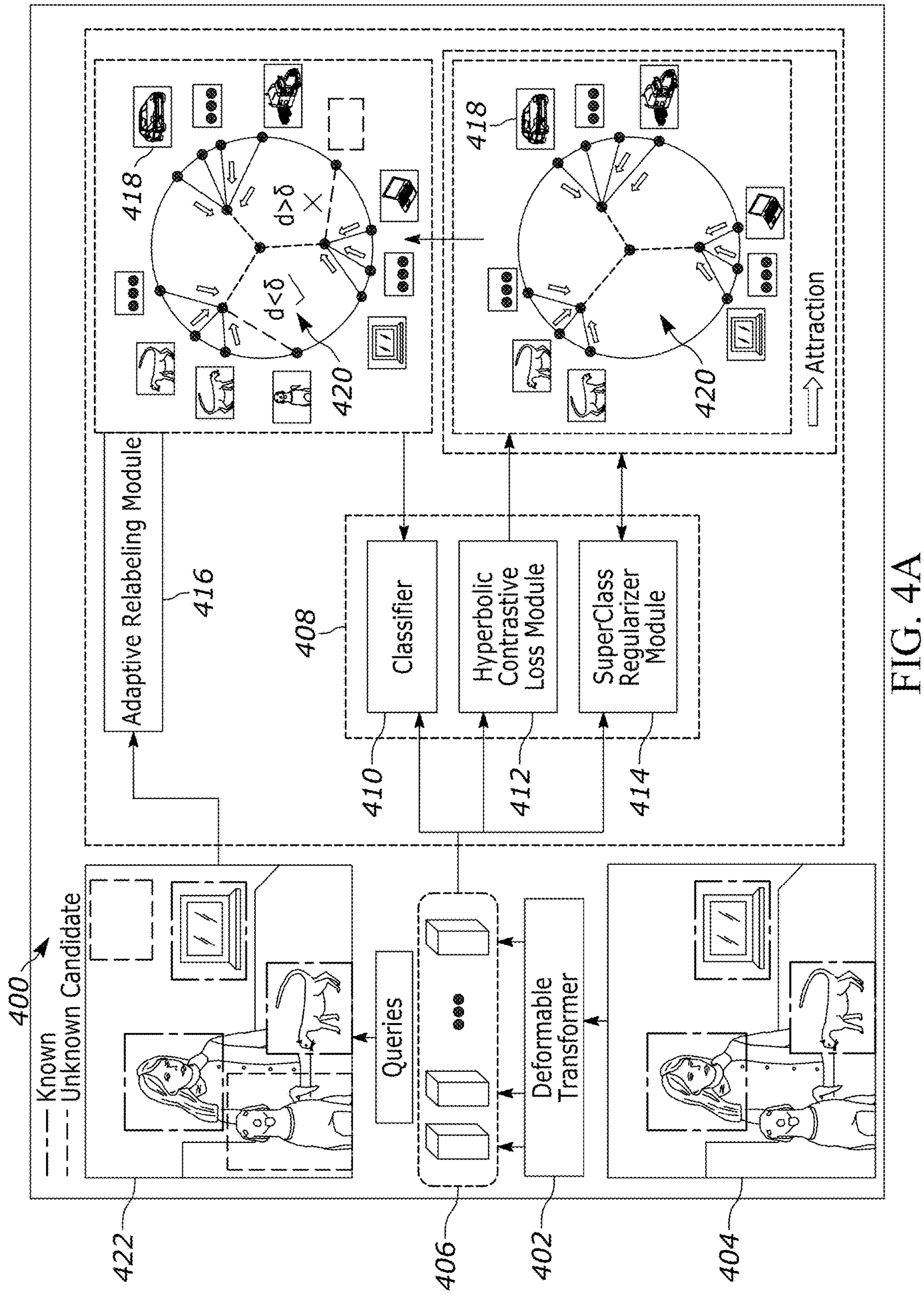
FIG. 4A is a functional block diagram of an example hyperbolic open world system according to the principles of the present disclosure.

FIG. 4A is a functional block diagram of an example Hyp-OW system 400 according to the present disclosure.

The system 400 includes one or more convolutional neural networks, such as a Deformable Transformer 402, configured to receive and process inputs corresponding to an observed scene (e.g., an input image 404). For example, the Deformable Transformer 402 implements an object detection model that performs deformable convolution on specific regions of the input image 404. An output 406 of the Deformable Transformer is a set of bounding boxes and class labels for objects detected in the input image 404, which are provided to a classification system 408 according to the present disclosure.

The classification system 408 includes a classifier 410 (e.g., a classifier configured to classify input signals into one or more labels using a machine-learning (ML) algorithm, such as a neural network), a hyperbolic contrastive loss module 412 configured to learn a hierarchical structural representation for each class, and a SuperClass Regularizer module 414 configured to regularize classes such that classes belonging to a same category are closer to one another in an embedding space (e.g., a hyperbolic embedding space) while being further away from classes of different categories. An Adaptive Relabeling module 416 leverages the learned hierarchical structure to relabel proposed candidates as unknowns if they meet a specific criterion as described below in more detail.

For example, various embeddings 418 (e.g., vector representations, which may be referred to as embeddings data) of images or image regions are positioned in an embedding space 420. To ensure that classes belonging to a same category (e.g., vehicles, animals, electronics, etc.) are closer in the embedding space 420 to one another and further away from classes from different categories, new (unmatched) embeddings can be moved closer to other classes in the same category. The Adaptive Relabeling module 416 receives known items and unknown candidates (e.g., from an input image 422) and may selectively relabel embeddings (e.g., based on comparison between a distance d of the unmatched embedding from a predetermined or calculated position (e.g., a centroid position) for the category within the embedding space 420 and a threshold distance δ). For example, if the distance d is less than or equal to the threshold distance δ, the embedding may be relabeled. Conversely, if the distance d is greater than the threshold distance δ, the embedding may not be relabeled.

In this manner, the Hyp-OW system 400 is configured to effectively capture hierarchical relationships between known and unknown classes, leading to improved object detection performance.

In an embodiment, each embedding is projected into a hyperbolic space (i.e., a hyperbolic embedding space) with an exponential mapping according to:

$$\exp_0^c(x) = \tanh\left(\sqrt{c}\,\frac{\|x\|}{2}\right)\frac{x}{\sqrt{c}\,\|x\|}.$$

For every embedding query q, a corresponding projection z into the hyperbolic space is defined as:

$$z = \exp_0^c(q).$$

The hyperbolic contrastive loss module 412 is configured to learn the hierarchical structural representation for each class to bring embeddings of the same classes closer together while pushing each class away from embeddings of different classes. For example, $z_i^c$ corresponds to a query that is matched with a class c∈K. For each query $z_i^c$, one positive example from a buffer M is sampled. The query $z_i^c$, where i∈A={B∪M}, is the query embedding of class c, which can come from either a batch B or the buffer M. A sample $z_{i+}$ corresponds to a positive sample while $z_{i-}$ corresponds to a negative sample. To attract embeddings of the query and the positive sample while repelling the embeddings from negative samples, hyperbolic contrastive loss can hence be written as:

$$\mathcal{L}_{hyp} = \sum_{\{i\in A, c\in K\}} \log \frac{\exp\frac{-d_{hyp}(z_i^c, z_{i+})}{\tau_1}}{\sum_{i-\in A\setminus\{i+,i\}} \frac{-d_{hyp}(z_i^c, z_{i-})}{\tau_1}},$$

where $\tau_1$ is the temperature, $$d_{hyp}(x, z_k) = \frac{2}{\sqrt{c}}\,arctanh\left(\sqrt{c}\,\|-x \oplus_c y\|\right), \text{ and } x \oplus_c y = \frac{\left(1 + 2c < x, y > + c\|y\|^2\right)x + \left(1 - c\|x\|^2\right)y}{\left(1 + 2c < x, y > + c^2\|x\|^2\|y\|^2\right)}.$$

The SuperClass Regularizer module 414 is configured to bring classes from the same category closer to each other and push them away from classes belonging to different categories. For a set of class indexes $S_p$ that belong to a Category p=1 . . . . P, to approximate a Category p embedding, a Hyperbolic Average of every embedding $$\{z_i^c\},\ i \in M$$

of class c∈$S_p$ is calculated in accordance with $$H_p = \frac{\sum_{i\in M, c\in S_p} \gamma_i z_i^c}{\sum_{i\in M} \gamma_i}, \text{ where } \gamma_i = \frac{1}{\sqrt{1 - c\|x\|^2}}$$

corresponds to the Lorentz factors.

For every embedding query $z_i^c$, a category embedding $H_p$ (cε$S_p$) is sampled from the buffer M and a same hyperbolic contrastive loss is used in accordance with:

$$\mathcal{L}_{hyp} = \sum_{\{i\in A, c\in S_p\}} \log \frac{\exp\frac{-d_{hyp}(z_i^c, H_p)}{\tau_2}}{\sum_{k\neq p, i\notin S_k} \frac{-d_{hyp}(z_i^c, H_k)}{\tau_2}}$$

The Adaptive Relabeling module 416 is configured to implement an adaptive relabeling scheme for queries $z^m$ from the incoming batch B that have been matched with a ground-truth label and queries $z^u$ that have not been matched with any ground-truth label (which may be referred to as "proposal candidates"). $Z_c$ corresponds to a Hyperbolic Average of every class c from the buffer M and represents a centroid in the hyperbolic embedding space for each class.

Distances between matched queries $z^m$ and the centroids are calculated to identify a maximum distance $\delta_B$ according to:

$$\delta_B = \max_{m \in B, c \in K} d_{hyp}(z^m, Z_c).$$

Distances between each unmatched query $z^u$ and all the centroids $Z_c$ are calculated and a minimum distance for each $z^u$ is selected. If the minimum distance is smaller than $\delta_B$, it may be assumed that the unmatched query likely contains an unknown item. Accordingly, every unmatched query $z^u$ can be relabeled in response to the following condition being true:

$$\min_{c \in K} d_{hyp}(z^u, Z_c) \leq \delta_B.$$

The unmatched queries can then be relabeled as unknowns and forwarded for classification.

A final loss L can be calculated according to:

$L = L_{cts} + L_{bbox} + \alpha L_{hyp} + \beta L_{reg}$, where coefficients $\alpha$ and $\beta$ respectively weight the Hyperbolic Contrastive Loss and the SuperClass Regularizer.

FIG. 4B shows a table 424 illustrating example performance of a data set ("Hyp-OW") of the systems and methods of the present disclosure relative to other example data sets for various tasks. As shown, the data sets may be evaluated for low, medium, and high difficulty levels. Evaluation metrics include U-Recall (e.g., unknown recall, shown as a percentage of unknown objects discovered) for unknown detection and mAP for known detection. Hyp-OW demonstrates consistent improvement over other techniques for both unknown and known detection at all difficulty levels.

Figure 4C:
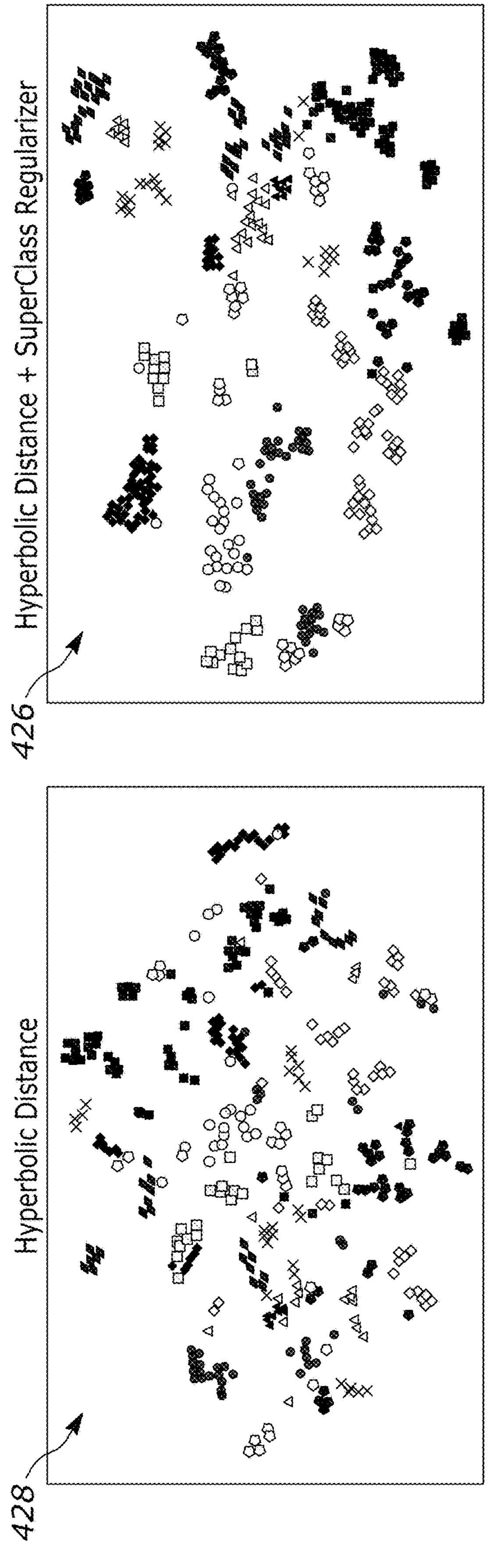
FIG. 4C illustrates T-distributed stochastic neighbor (t-SNE) plots illustrating learned embedding achieved using hyperbolic distance according to principles of the present disclosure.

FIG. 4C shows T-distributed stochastic neighbor (t-SNE) plots 426 and 428 illustrating learned embedding achieved using hyperbolic distance, with (at 426) and without (at 428) using the SuperClass Regularizer module 414 according to the present disclosure. Each class is represented based on a corresponding category. As shown, using the SuperClass Regularizer module 414 as described herein enforces a more distinct grouping of classes belonging to the same categories, enhancing a hierarchical structure and effectively separating the embeddings of different categories.

FIG. 4D shows a table 432 illustrating an example ablation analysis that quantifies the impact of individual components of Hyp-OW techniques of the present disclosure (e.g., results obtained using a cosine distance, results obtained without using the SuperClass Regularizer Module 414, and results obtained without using adaptive relabeling). The results demonstrate that the Adaptive Relabeling module 416 improves the accuracy of known detection (mAP) while the SuperClass Regularizer module 414 improves the accuracy unknown detection (U-Recall). Conversely, using cosine distance (i.e., instead of hyperbolic distance) results in decreased accuracy of unknown detection.

Figure 4E:
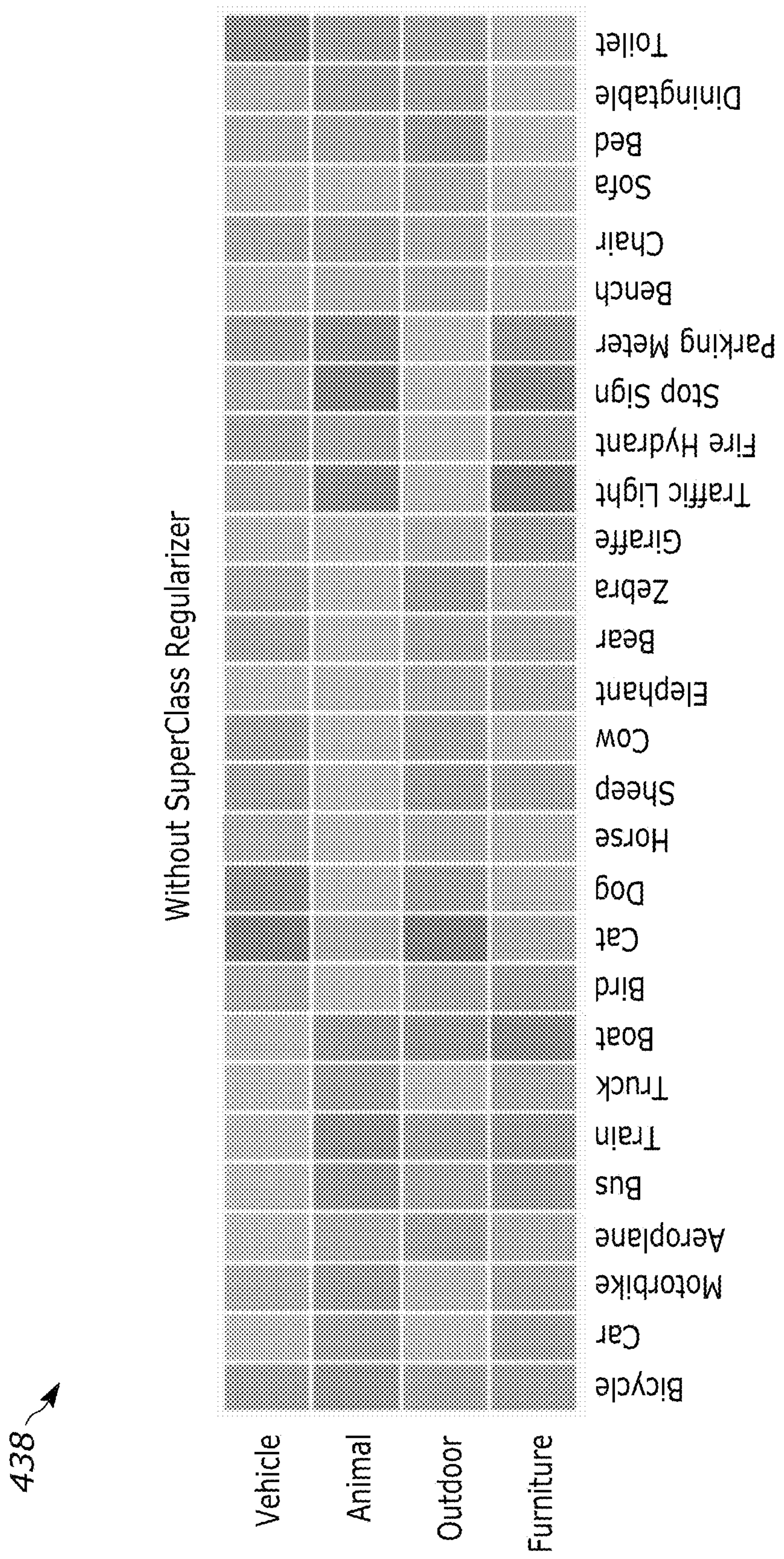
FIG. 4E depicts example class distance heatmaps that quantify hyperbolic distance according to the principles of the present disclosure.
Figure 4E:
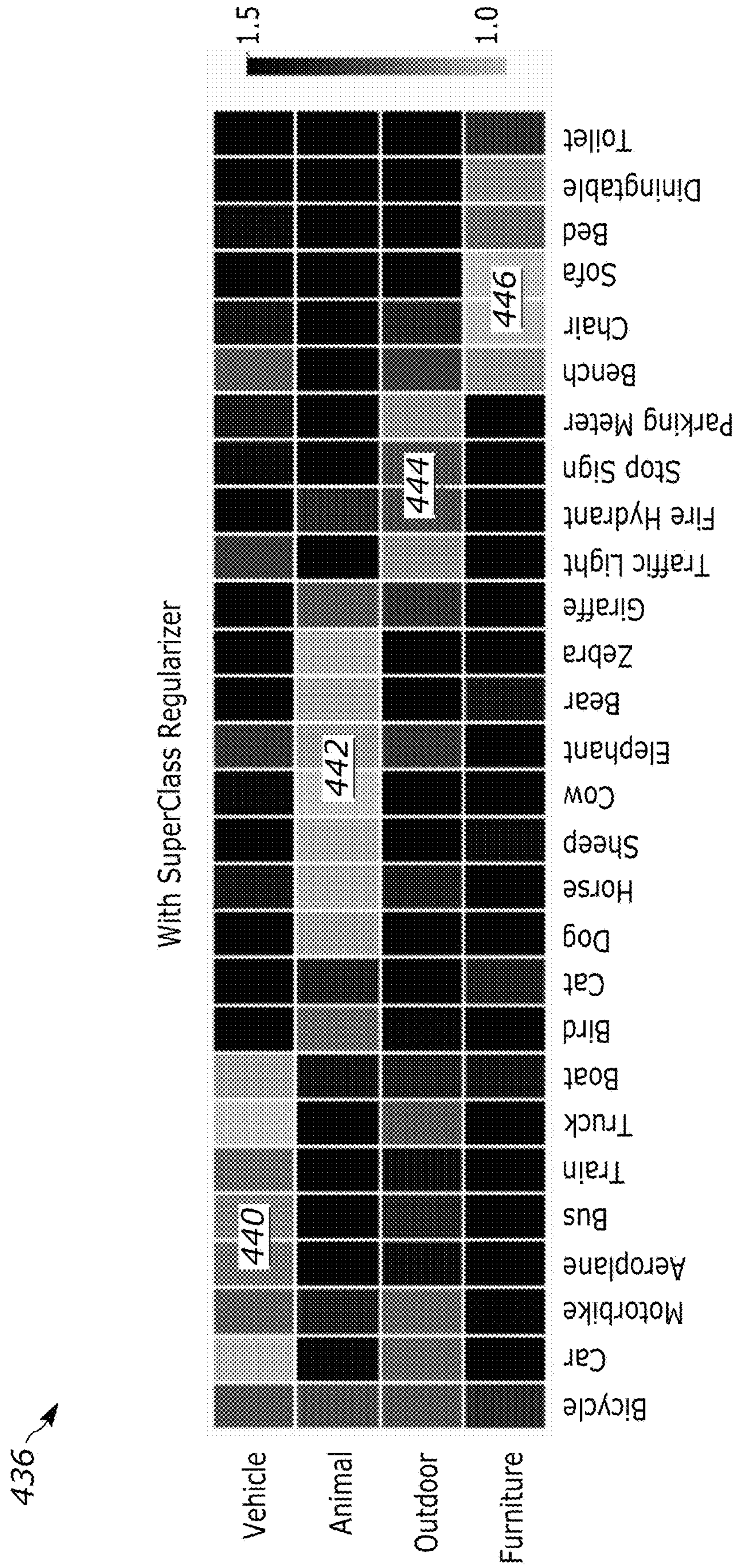

FIG. 4E shows example class distance heatmaps 436 and 438 that quantify hyperbolic distance (e.g., from 1.0 to 1.5) between category embeddings (e.g., vehicle, animal, outdoor, furniture) and individual classes (e.g., bicycle, car, motorbike, aeroplane, etc.), where lighter shading indicates lesser distance (and greater similarity) and darker shading indicates greater distance (and less similarity). Results obtained using the SuperClass Regularizer module 414 are shown at 436 and results obtained without using the SuperClass Regularizer module 414 are shown at 438. The heatmap 436 illustrates that the use of the SuperClass Regularizer module 414 enhances the distances both within categories and between categories. For example, as shown, classes within groupings 440, 442, 444, and 446 are closer to respective categories and further from other categories. Accordingly, use of the SuperClass Regularizer module 414 separates different categories from one another in hyperbolic space and groups classes in the same category more tightly together in hyperbolic space. In contrast, without using the SuperClass Regularizer module 414 as shown at 438, distances between categories within hyperbolic space appear less pronounced as indicated by weaker shading intensity.

Figure 4F:
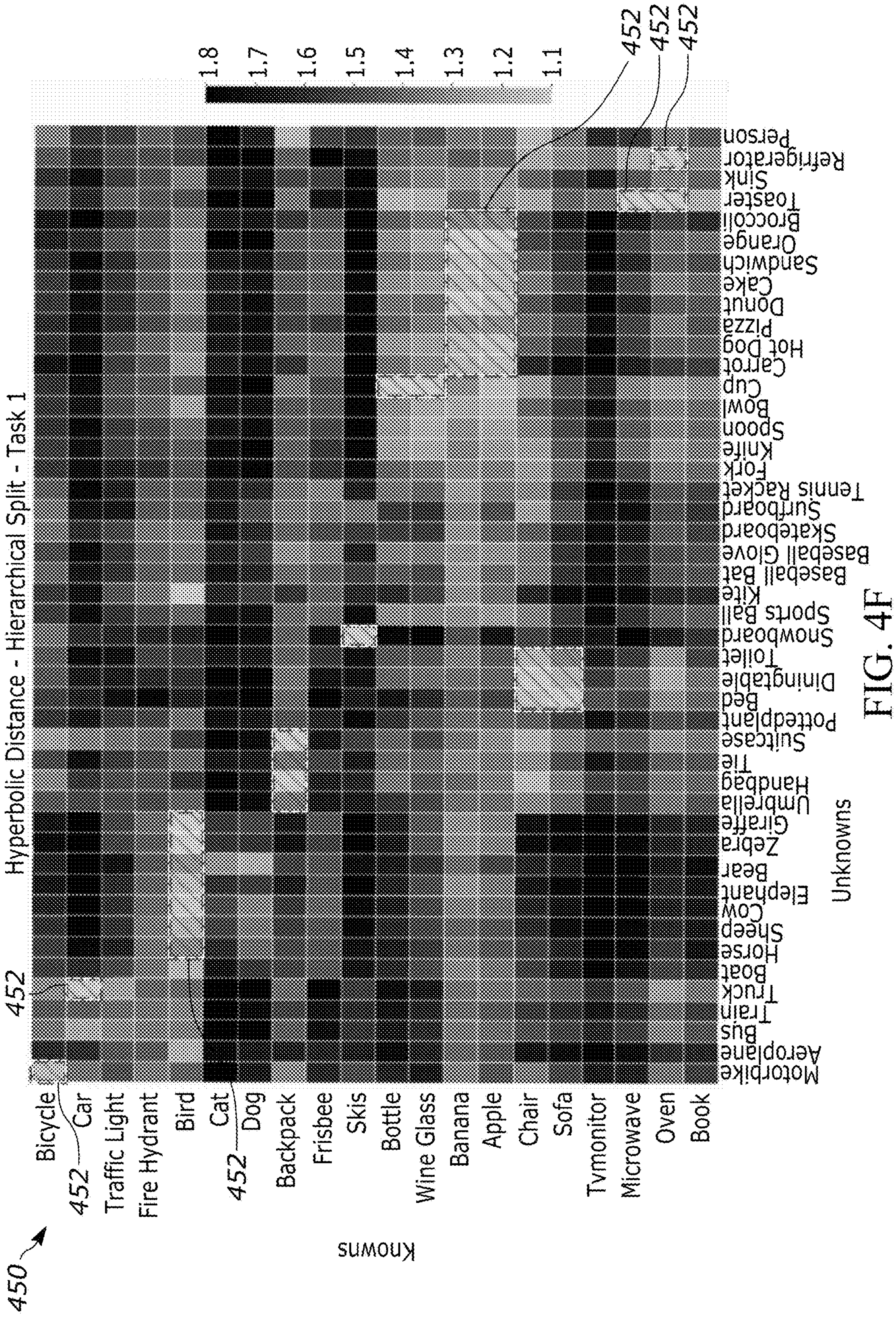
FIG. 4F depicts an example distance heatmap that quantifies hyperbolic distance between known items and unknown items according to the principles of the present disclosure.

FIG. 4F shows an example distance heatmap 450 that quantifies hyperbolic distance between known items and unknown items for a task (e.g., Task 1) of a hierarchical split, where lighter shading indicates lesser distance (and greater similarity) and darker shading indicates greater distance (and less similarity). As shown, there is a smaller distance observed between known and unknown items belonging to a same category (as shown in some examples by boxes 452). Accordingly, unknown items can be effectively detected and labeled based on their similarity to known items (e.g., by the Adaptive Relabeling module 416).

Figure 4G:
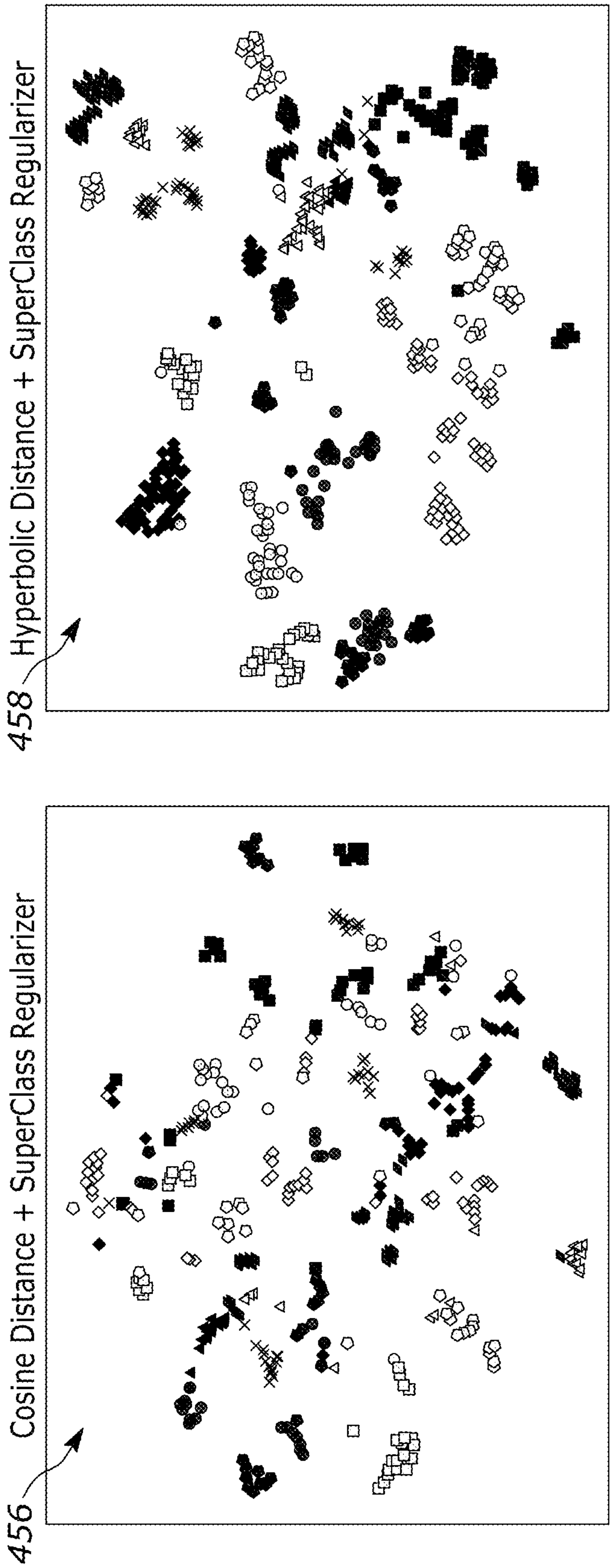
FIG. 4G depicts t-SNE plots of learned embeddings using cosine and hyperbolic distance metrics according to the principles of the present disclosure.

FIG. 4G shows t-SNE plots 456 and 458 of learned embeddings using two different distance metrics: cosine distance (at 456) and hyperbolic distance (at 458). The use of hyperbolic distance shapes the embeddings in a hierarchically structured manner such that classes belonging to a same category exhibit a more cohesive grouping (i.e., improved clustering) and embeddings of different categories are effectively separated.

Figure 4H:
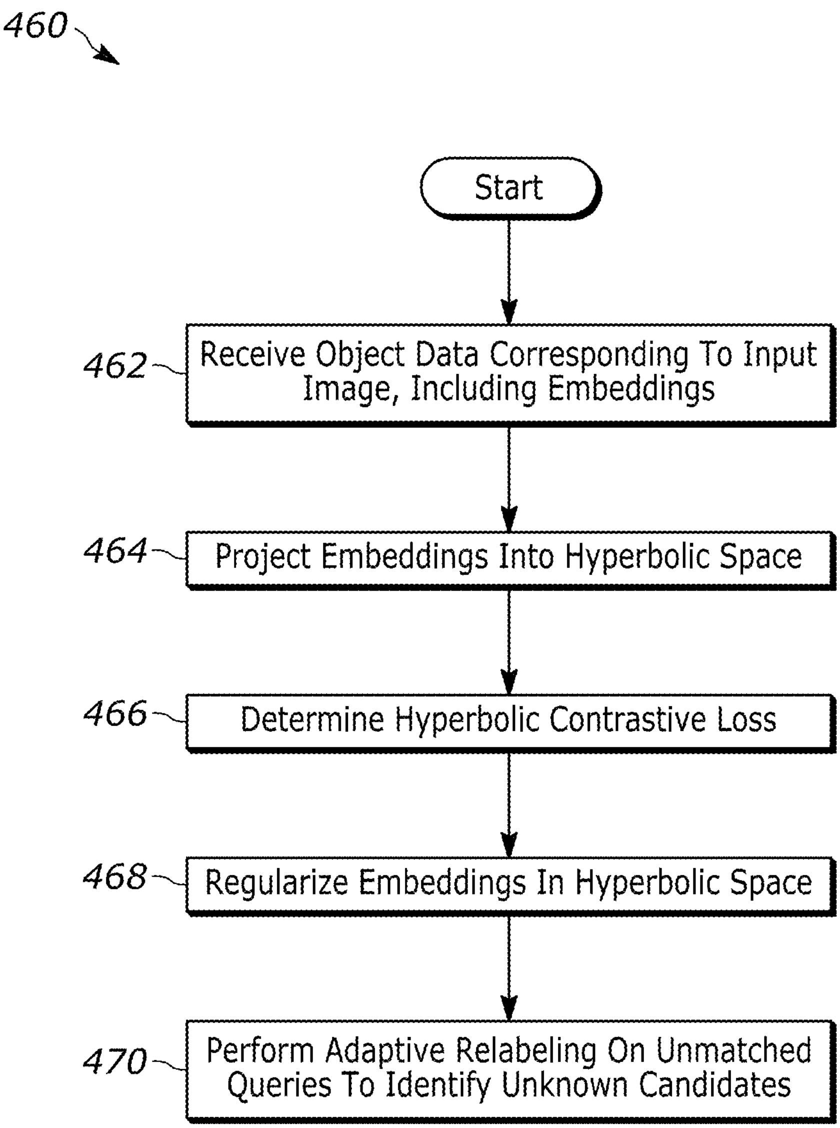
FIG. 4H illustrates steps of an example hyperbolic open world method according to the principles of the present disclosure.

FIG. 4H illustrates steps of an example hyperbolic open world object detection method 460 according to the principles of the present disclosure. At 462, the method 460 receives object data corresponding to an input image. For example, the method 460 receives a set of bounding boxes and class labels for objects detected in an input image, which correspond to embeddings of known items. At 464, the method 460 projects the embeddings into hyperbolic space. At 466, the method 460 determines a hyperbolic contrastive loss as described above.

At 468, the method 460 regularizes the embeddings in the hyperbolic space. As used herein, "regularize" refers to regularizing classes such that classes belonging to a same category are closer to one another in an embedding space (e.g., a hyperbolic embedding space) while being further away from classes of different categories (e.g., using the SuperClass Regularizer module 414 as described above). For example, regularizing the embeddings according to the principles of the present disclosure includes determining a hyperbolic average of embeddings in a given class.

At 470, the method 460 performs adaptive relabeling (e.g., using the Adaptive Relabeling module 416) on proposed unknown candidates (e.g., unmatched queries) from an input image. For example, proposed unknown candidates that are less than a predetermined distance (e.g., the threshold distance described above) from at least one calculated centroid of all categories are relabeled as unknowns.

As described above, systems and methods according to the principles of the present disclosure emphasize a semantic relationship between known and unknown items. For example, a Hyp-OW data set according to the principles of the present disclosure is configured to define a high level of hierarchy among items that emphasizes the semantic relationship. As described above, the Hyp-OW systems and methods: (i) apply hyperbolic contrastive loss to learn and model the hierarchical structure by moving embeddings of same classes closer together and moving embeddings away from embeddings of different classes (e.g., using the hyperbolic contrastive loss module 412); (ii) move classes from a same category closer together while pushing classes away from classes of different categories (e.g., using the Super-Class Regularizer module 414); and (iii) implement adaptive relabeling to use semantic similarity distance to dynamically relabel proposed candidates as unknowns to leverage the learned hierarchical structure (e.g., using the Adaptive Relabeling module 416).

Figure 5:
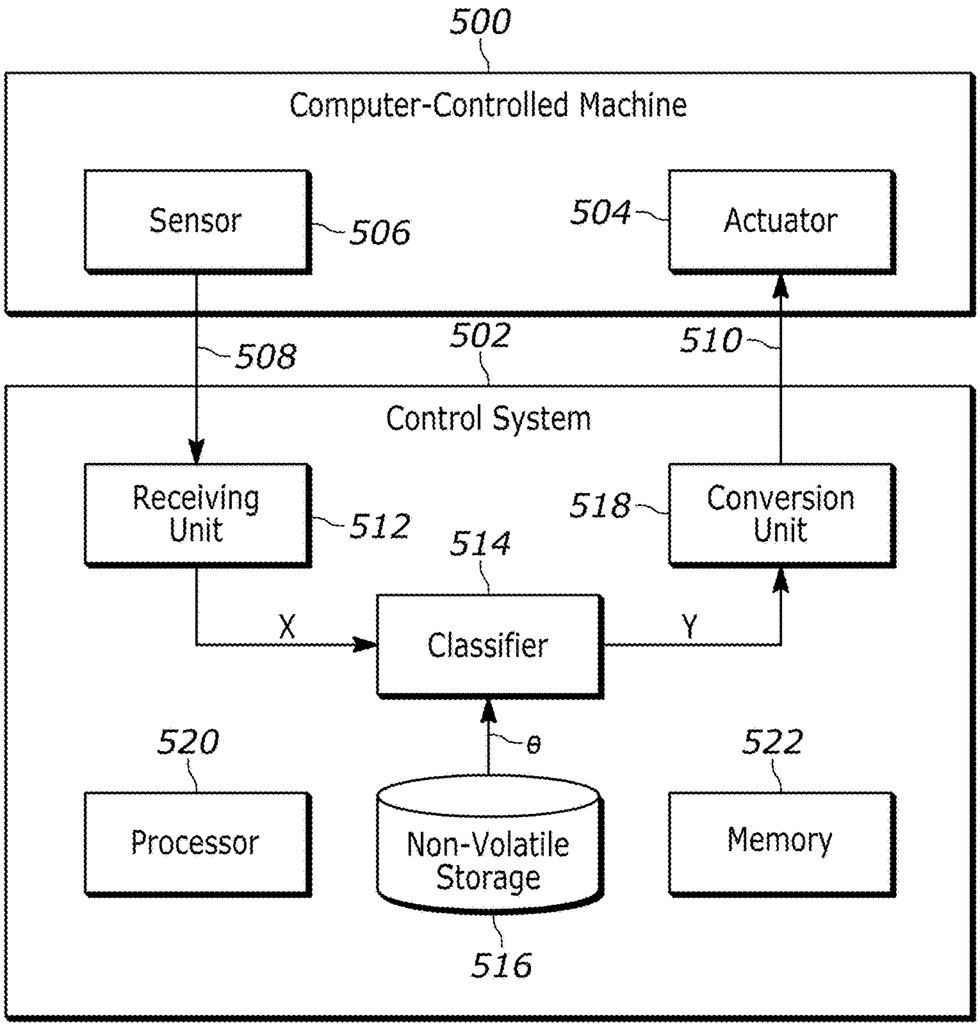
FIG. 5 depicts a schematic diagram of an interaction between a computer-controlled machine and a control system according to the principles of the present disclosure.

FIGS. 5-11 depict example systems and devices that may implement OWOD systems and methods according to the present disclosure. FIG. 5 depicts a schematic diagram of an interaction between a computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
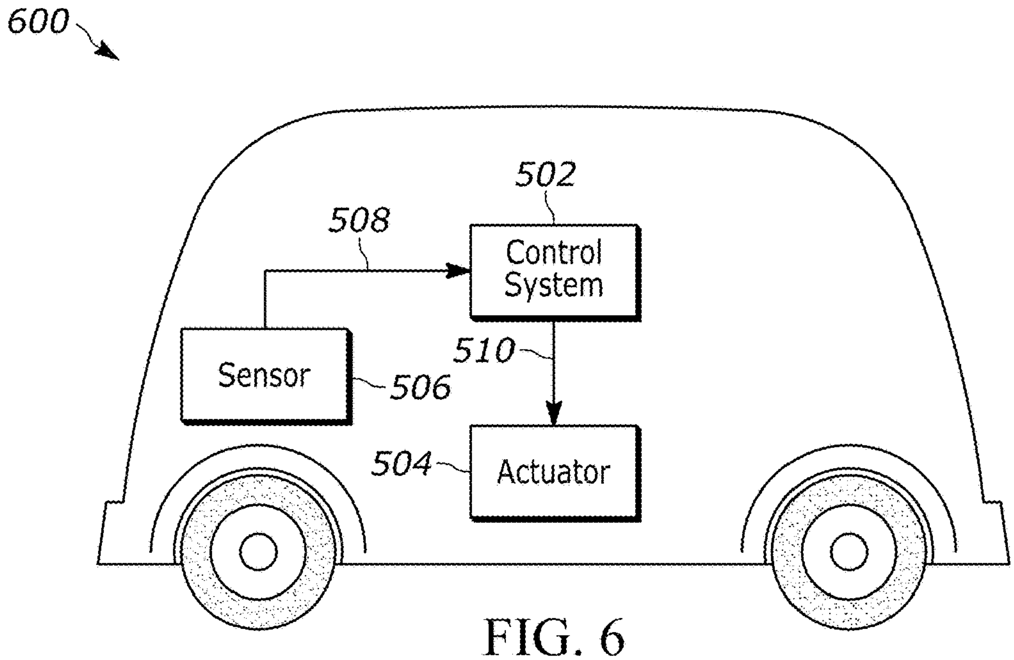
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
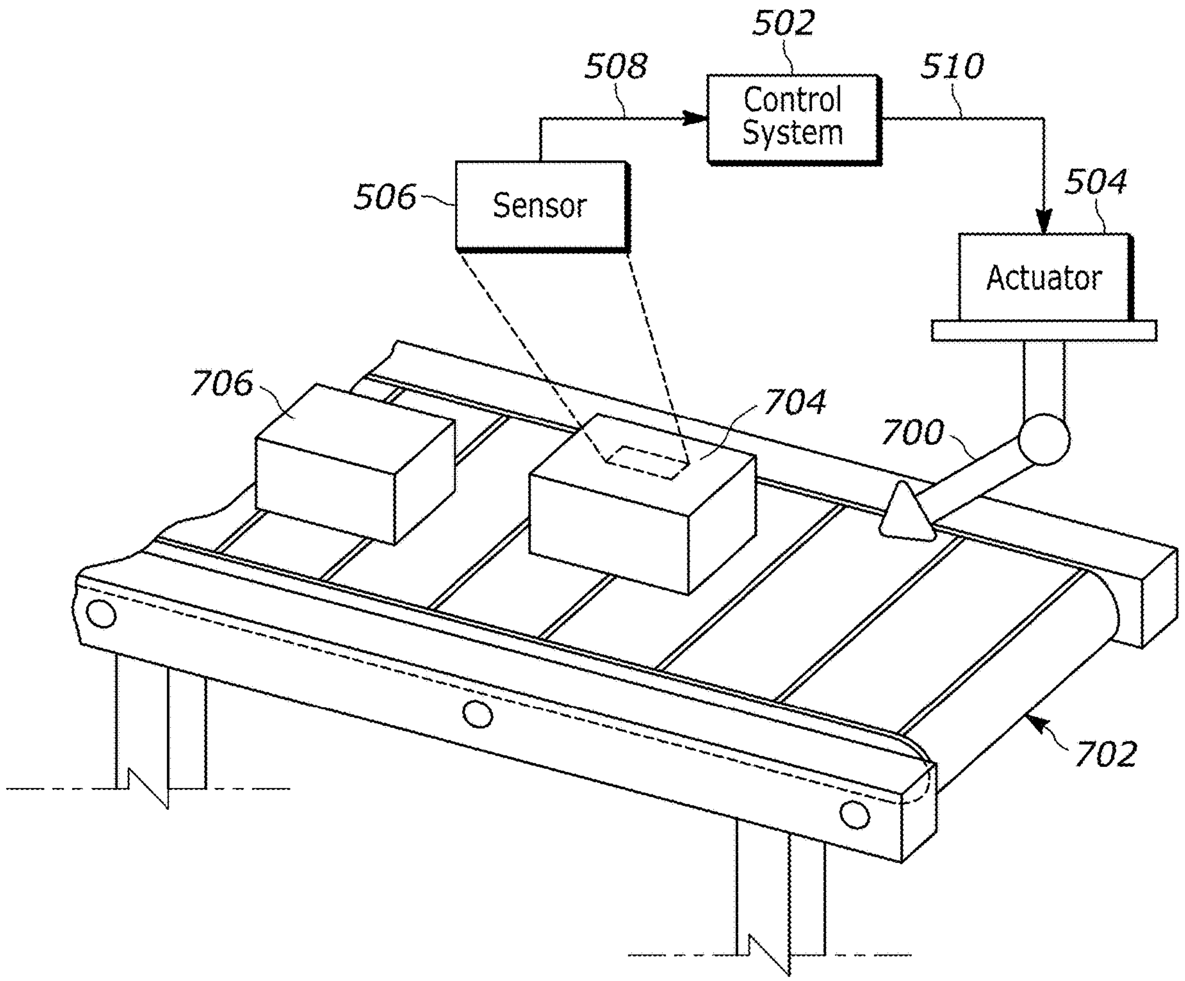
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
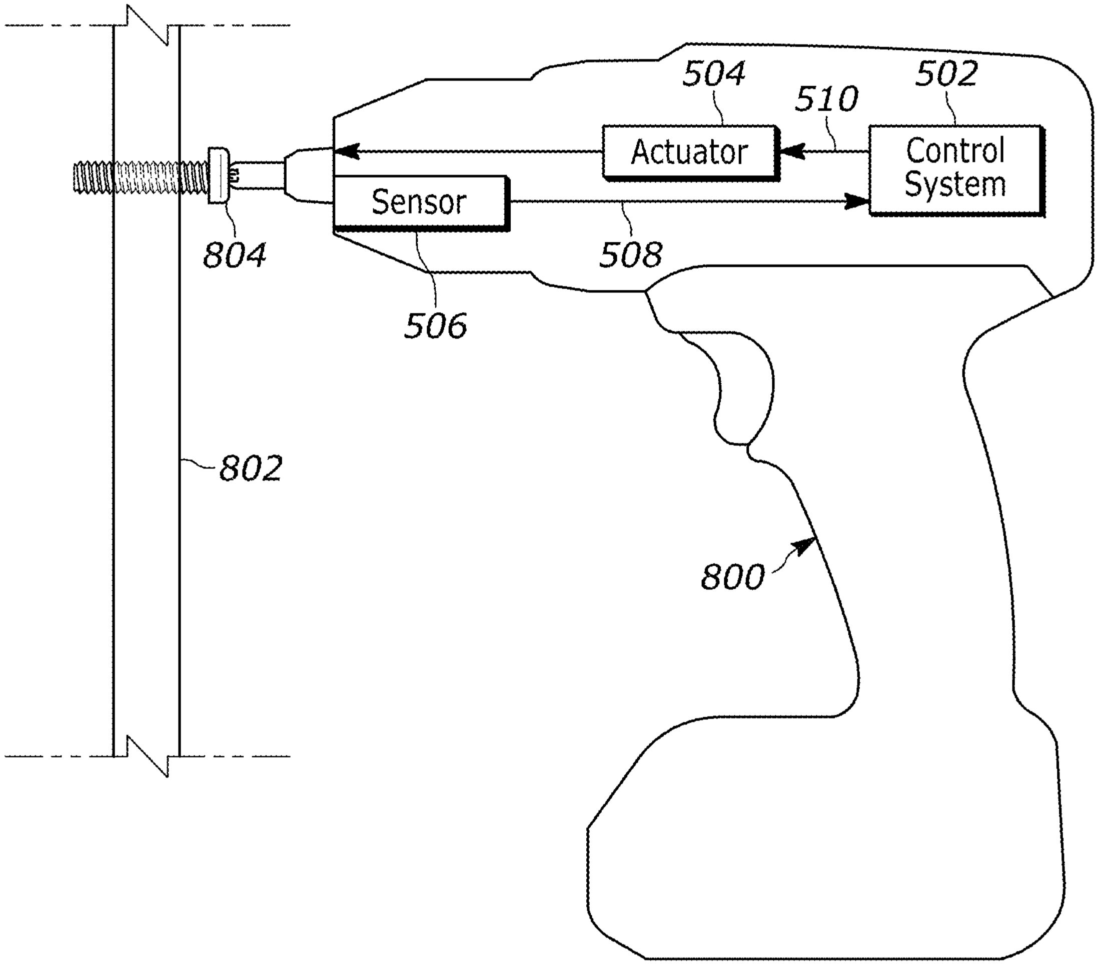
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802.

The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
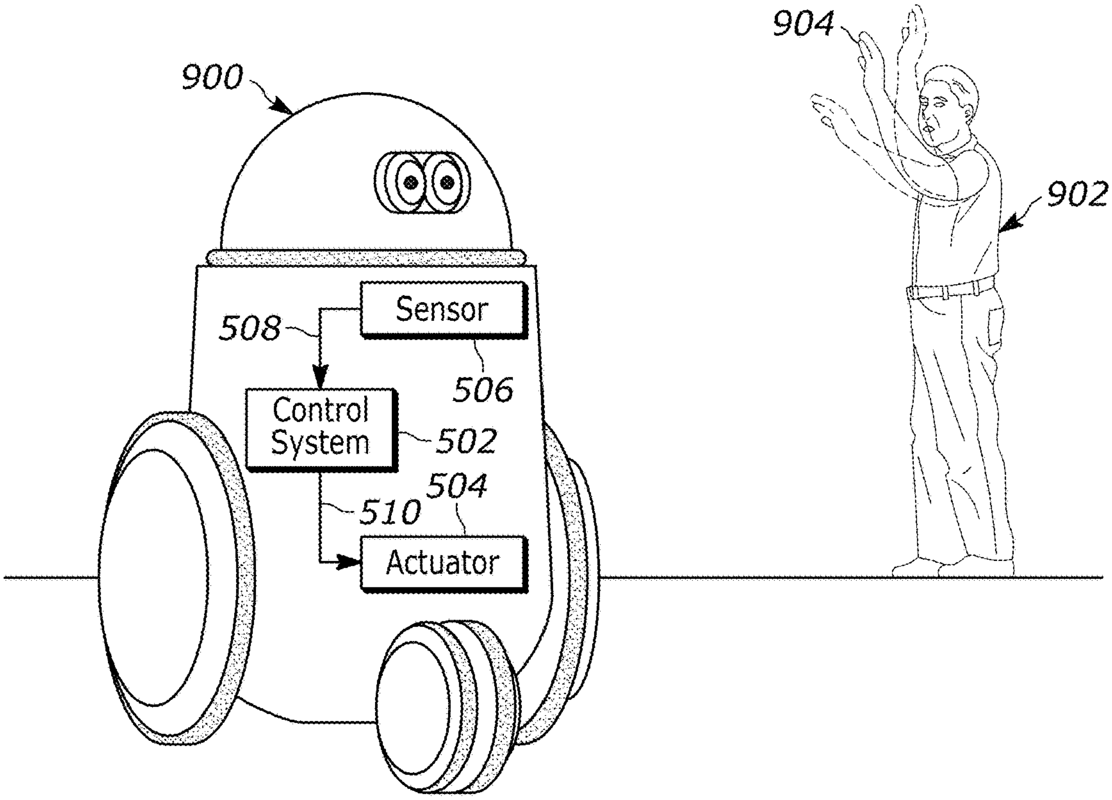
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
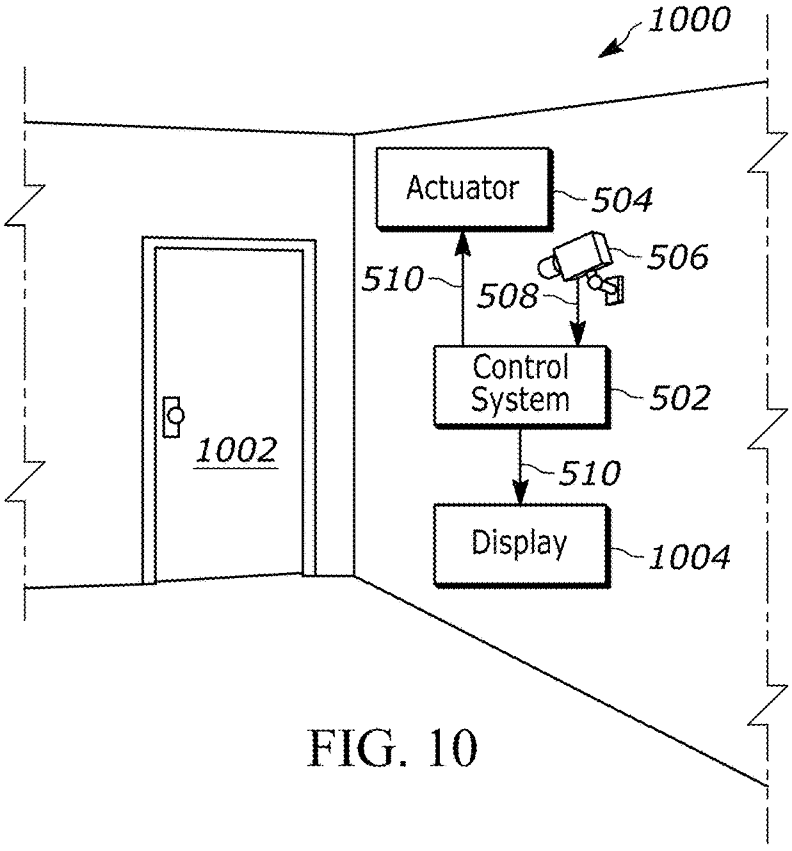
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
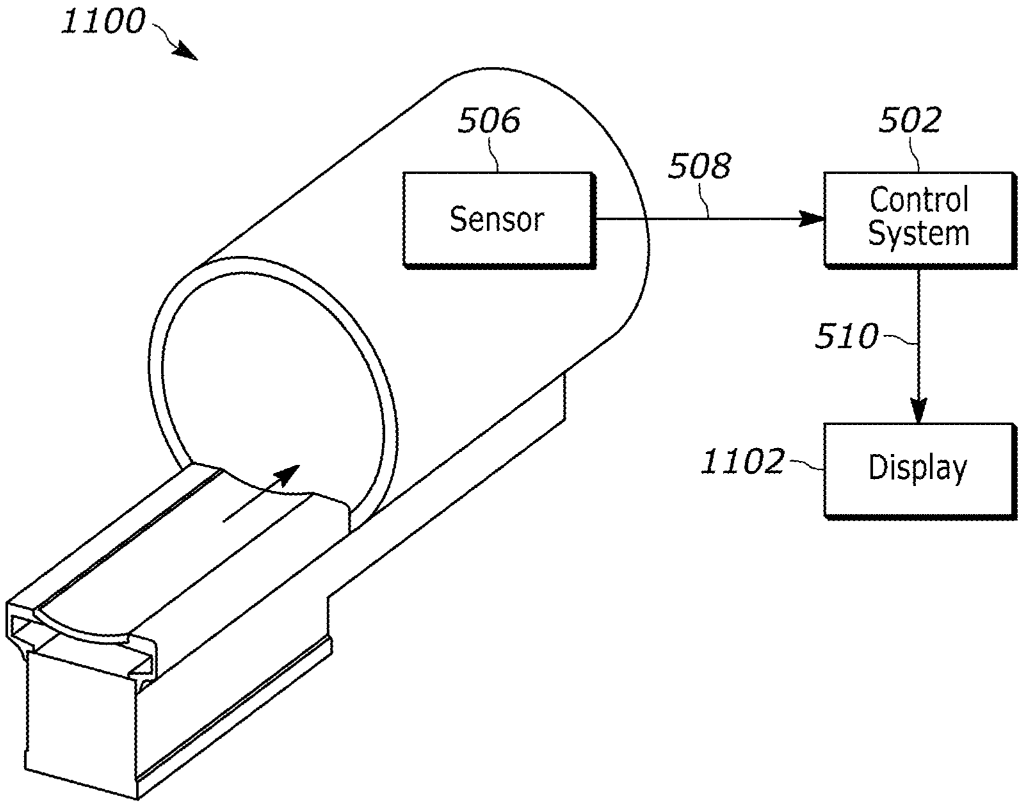
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of performing open world object detection, the method comprising, using one or more processors:

receiving object data, wherein the object data includes embeddings data corresponding to embeddings for known objects in a first input image;

projecting the embeddings into a hyperbolic embedding space, wherein the hyperbolic embedding space includes embeddings in a plurality of categories of objects, and wherein each of the plurality of categories of objects includes one or more classes of objects;

regularizing the projected embeddings within the hyperbolic embedding space, wherein regularizing the projected embeddings within the hyperbolic embedding space includes determining respective hyperbolic averages of embeddings in each of the classes of objects, determining a threshold distance based on the hyperbolic averages, and moving each of the projected embeddings (i) closer to embeddings in a same category of the plurality of categories and (ii) further away from embeddings in different categories of the plurality of categories;

receiving an unmatched query corresponding to an object in a second input image; and generating, in response to a determination that the unmatched query is less than the threshold distance from at least one of the hyperbolic averages, an output signal that indicates that the object in the second input image corresponds to an unknown object; and controlling an operation of a computer-controlled machine in response to the output signal.

2. The method of claim 1, wherein the object data includes a set of bounding boxes and class labels for the known objects in the first input image.

3. The method of claim 1, wherein the first input image corresponds to a training image.

4. The method of claim 1, further comprising determining a hyperbolic contrastive loss corresponding to the hyperbolic embedding space, wherein regularizing the projected embeddings includes regularizing the projected embeddings based on the hyperbolic contrastive loss.

5. A computing device configured to perform open world object detection, the computing device including a processing device configured to execute instructions stored in memory to:

receive object data, wherein the object data includes embeddings data corresponding to embeddings for known objects in a first input image;

project the embeddings into a hyperbolic embedding space, wherein the hyperbolic embedding space includes embeddings in a plurality of categories of objects, and wherein each of the plurality of categories of objects includes one or more classes of objects;

regularize the projected embeddings within the hyperbolic embedding space, wherein regularizing the projected embeddings within the hyperbolic embedding space includes determining respective hyperbolic averages of embeddings in each of the classes of objects determining a threshold distance based on the hyperbolic averages, and moving each of the projected embeddings (i) closer to embeddings in a same category of the plurality of categories and (ii) further away from embeddings in different categories of the plurality of categories;

receive an unmatched query corresponding to an object in a second input image; and generate, in response to a determination that the unmatched query is less than the threshold distance from at least one of the hyperbolic averages, an output signal that indicates that the object in the second input image corresponds to an unknown object; and control an operation of a computer-controlled machine in response to the output signal.

6. The computing device of claim 5, wherein the object data includes a set of bounding boxes and class labels for the known objects in the first input image.

7. The computing device of claim 5, wherein the first input image corresponds to a training image.

8. The computing device of claim 5, the processing device further configured to execute instructions stored in memory to generate a hyperbolic contrastive loss corresponding to the hyperbolic embedding space, wherein regularizing the projected embeddings includes regularizing the projected embeddings based on the hyperbolic contrastive loss.

9. A computer-controlled machine, comprising:

at least one sensor configured to generate a first input image and a second input image;

a control system configured to receive object data, wherein the object data includes embeddings data corresponding to embeddings for known objects in a first input image, project the embeddings into a hyperbolic embedding space, wherein the hyperbolic embedding space includes embeddings in a plurality of categories of objects, and wherein each of the plurality of categories of objects includes one or more classes of objects, regularize the projected embeddings within the hyperbolic embedding space, wherein regularizing the projected embeddings within the hyperbolic embedding space includes determining respective hyperbolic averages of embeddings in each of the classes of objects, determining a threshold distance based on the hyperbolic averages, and moving each of the projected embeddings (i) closer to embeddings in a same category of the plurality of categories and (ii) further away from embeddings in different categories of the plurality of categories, receive an unmatched query corresponding to an object in a second input image, and generate, in response to a determination that the unmatched query is less than the threshold distance from at least one of the hyperbolic averages, an output signal that indicates that the object in the second input image corresponds to an unknown object; and an actuator configured to control an operation of the computer-controlled machine in response to the output signal.

10. The computer-controlled machine of claim 9, further comprising memory that stores data corresponding to the hyperbolic embedding space.

11. The computer-controlled machine of claim 9, wherein the control system is further configured to generate a hyperbolic contrastive loss corresponding to the hyperbolic embedding space, wherein regularizing the projected embeddings includes regularizing the projected embeddings based on the hyperbolic contrastive loss.

* * * * *